(12) United States Patent
Roark

(10) Patent No.: US 8,788,331 B2
(45) Date of Patent: Jul. 22, 2014

(54) METHOD AND APPARATUS FOR IDENTIFYING INTERNATIONAL TRAVELERS AND PROVIDING AN INCENTIVE TO PURCHASE TRAVEL SERVICES

(75) Inventor: Joseph B. Roark, Half Moon Bay, CA (US)

(73) Assignee: Joseph B. Roark, Half Moon Bay, CA (US)

( * ) Notice: Subject to any disclaimer, the term of this patent is extended or adjusted under 35 U.S.C. 154(b) by 372 days.

(21) Appl. No.: 12/437,434

(22) Filed: May 7, 2009

(65) Prior Publication Data

US 2010/0287008 A1 Nov. 11, 2010

(51) Int. Cl.
*G06Q 30/00* (2012.01)

(52) U.S. Cl.
USPC ...... 705/14.16; 705/14.1; 705/26.1; 705/27.1

(58) Field of Classification Search
USPC ............................. 705/14.1, 14.16, 26.1, 27.1
See application file for complete search history.

(56) References Cited

U.S. PATENT DOCUMENTS

| 6,029,141 | A | | 2/2000 | Bezos et al. | |
|---|---|---|---|---|---|
| 6,085,976 | A | * | 7/2000 | Sehr | 235/384 |
| 6,386,451 | B1 | * | 5/2002 | Sehr | 235/384 |
| 6,565,000 | B2 | * | 5/2003 | Sehr | 235/384 |
| 6,609,658 | B1 | * | 8/2003 | Sehr | 235/384 |
| 6,609,659 | B2 | * | 8/2003 | Sehr | 235/384 |
| 6,910,628 | B1 | * | 6/2005 | Sehr | 235/384 |
| 6,926,203 | B1 | * | 8/2005 | Sehr | 235/492 |
| 7,184,971 | B1 | | 2/2007 | Ferber | |
| 7,337,133 | B1 | | 2/2008 | Bezos et al. | |
| 8,219,445 | B2 | | 7/2012 | Tai | |
| 2001/0037205 | A1 | | 11/2001 | Joao | |
| 2001/0037283 | A1 | | 11/2001 | Mullaney | |
| 2002/0029290 | A1 | | 3/2002 | Burema et al. | |
| 2002/0082919 | A1 | | 6/2002 | Landau et al. | |
| 2002/0099622 | A1 | | 7/2002 | Langhammer | |
| 2002/0100802 | A1 | * | 8/2002 | Sehr | 235/384 |
| 2002/0100803 | A1 | * | 8/2002 | Sehr | 235/384 |
| 2003/0014331 | A1 | | 1/2003 | Simons | |
| 2003/0135414 | A1 | | 7/2003 | Tai | |
| 2005/0119937 | A1 | | 6/2005 | Estes | |
| 2005/0171838 | A1 | | 8/2005 | Eglinton | |
| 2005/0177844 | A1 | | 8/2005 | Levi et al. | |
| 2007/0050245 | A1 | | 3/2007 | Humphries et al. | |
| 2007/0219871 | A1 | | 9/2007 | Rolf et al. | |
| 2008/0109323 | A1 | * | 5/2008 | Leach et al. | 705/26 |
| 2008/0147507 | A1 | | 6/2008 | Langhammer | |
| 2008/0167946 | A1 | | 7/2008 | Bezos et al. | |
| 2008/0300991 | A1 | * | 12/2008 | Openiano | 705/14 |

(Continued)

*Primary Examiner* — Sara C Hamilton
(74) *Attorney, Agent, or Firm* — Michael A. Glenn; Perkins Coie LLP

(57) ABSTRACT

Generating a commission for a passport photo provider by identifying a group of people that are about to travel in the near future, providing the customers with an incentive to purchase a travel service and a token to identify the passport photo provider, the customer purchasing a travel service, and the travel service provider transmitting a commission to the passport photo provider. The incentive is a discount on a travel service, such as travel insurance. The token is a uniform resource locator (URL) with a file path on the end for identifying the source of the incentive or a coupon code. The token and the incentive are printed on a brochure that also contains passport photos. If the customer makes a subsequent purchase of travel services, the passport photo provider receives an additional commission.

7 Claims, 6 Drawing Sheets

(56) References Cited

U.S. PATENT DOCUMENTS

| | | |
|---|---|---|
| 2009/0138359 A1 | 5/2009 | Tai |
| 2009/0182637 A1 | 7/2009 | Roberts |
| 2009/0192891 A1 | 7/2009 | Titus et al. |
| 2009/0259547 A1* | 10/2009 | Clopp ........................ 705/14.16 |
| 2009/0276305 A1* | 11/2009 | Clopp ........................ 705/14.16 |
| 2010/0262475 A1 | 10/2010 | Gavriline et al. |

* cited by examiner

METHOD AND APPARATUS FOR IDENTIFYING INTERNATIONAL TRAVELERS AND PROVIDING AN INCENTIVE TO PURCHASE TRAVEL SERVICES

BACKGROUND OF THE INVENTION

1. Technical Field

This invention relates generally to the field of travel insurance. More specifically, this invention relates to providing travel insurance offers in conjunction with passport photos.

2. Description of the Related Art

As travel becomes cheaper and the Internet makes research easier, Americans are choosing to vacation in more exotic locations. A quick look at the travel section of the New York Times, for example, reveals articles on destinations such as Africa, Barbados, Berlin, Spain, China, Majorca, New Delhi, Norway, and Venice. When a tourist is in a foreign country and a problem arises, however, obtaining help for the problem, such as medical services, can be quite difficult. The language barrier further complicates the search for services.

Since the events of Sep. 11, 2001, the demand for travel insurance increased five-fold from 8-10% to over 40% of travelers. In 2006, over $1.3 billion was spent on travel insurance. Travel insurance typically provides coverage in the following three areas: (1) financial reimbursement for problems relating to the trip, e.g. trip cancellation or delay relating to illness or bad weather, baggage loss, etc.; (2) medical insurance and medical evacuation coverage when illness or injury occurs; and (3) assistance for helping to locate doctors, make arrangements, or contact family members in an emergency.

To travel to a different country, a tourist must obtain a passport. In 2005, nine million new or renewed passports were issued by the state department. Passport photos can be obtained from the post office, the drugstore, cell-phone stores, or even shipping stores, such as UPS. These passport photos are delivered to the customer in a laminated folder, such as the one illustrated in FIG. 1 (prior art). These folders are blank except for instructions for how to insert the photos. Two photographs are provided and inserted between the die cuts 100.

M. Scroggie, System and Method for Providing Shopping Aids and Incentives to Customers through a Computer Network, U.S. Pat. No. 6,885,994 (26 Apr. 2005) discloses a system for transmitting an electronic coupon for a retail store to a customer over the Internet. The system receives a postal region code from the customer and provides coupons of interest to the customer. For example, if the customer is shopping for groceries, the customer can browse through a list of available products and select products on the computer screen to receive an electronic coupon. The customer prints out the coupon and redeems it at the grocery store identified on the coupon.

SUMMARY OF THE INVENTION

A system and method for the distribution, via a computer network, of a packaging product that integrates an incentive for travel services and a token that identifies the passport photo identifier into a passport photo brochure. In one embodiment, the incentive is a discount for purchasing travel insurance or airfare, travel, or lodging services. The token is a unique uniform resource locator (URL) with a file path on the end for identifying the passport photo brochure. In another embodiment, the token is a unique coupon code that is entered at the time of purchase of the travel service.

When the customer purchases a travel service, the customer registers with the travel service provider. Based on the identity of the passport photo identifier, which is gleaned from the token, the travel service provider transmits a commission to the passport photo provider. In one embodiment, the passport photo provider then transmits a commission to a third party, such as the photo passport brochure printer, who brokered the initial deal with the travel service provider.

In one embodiment, during registration, the travel insurance provider creates a database of at least customer identification, a means for communicating with the customer, and the initial purchase date to track the customer and send reminders or additional incentives to the customer. In one embodiment, the passport photo provider receives a commission from any subsequent purchase of a travel service as a reward for generating the initial customer.

DETAILED DESCRIPTION OF THE INVENTION

The invention comprises a system and method for identifying a subset of customers that are likely to travel in the near future, providing the customers with a token for a travel service provider and an incentive for purchasing a travel service product, and a means for the travel service provider to transmit a commission to a passport photo provider for identifying customers that purchased travel services as a result of receiving the token and incentive. In one embodiment, the token and incentive are printed onto a passport photo brochure. The travel service provider transmits a commission to the passport photo provider and/or a third party.

The travel services include any service that might aid the customer in travel, such as travel insurance, lodging, transportation, guided tours, cruises, etc. The travel service provider can be a single service provider, such as the owner of a hotel or a car rental service, or the travel service provider can be a company that specializes in providing a variety of services, such as Travelocity or Orbitz. For a travel service provider that provides a variety of services, the incentive can be for a discount on multiple services. In one embodiment, the travel service provider is a travel insurance provider.

Figure 1:
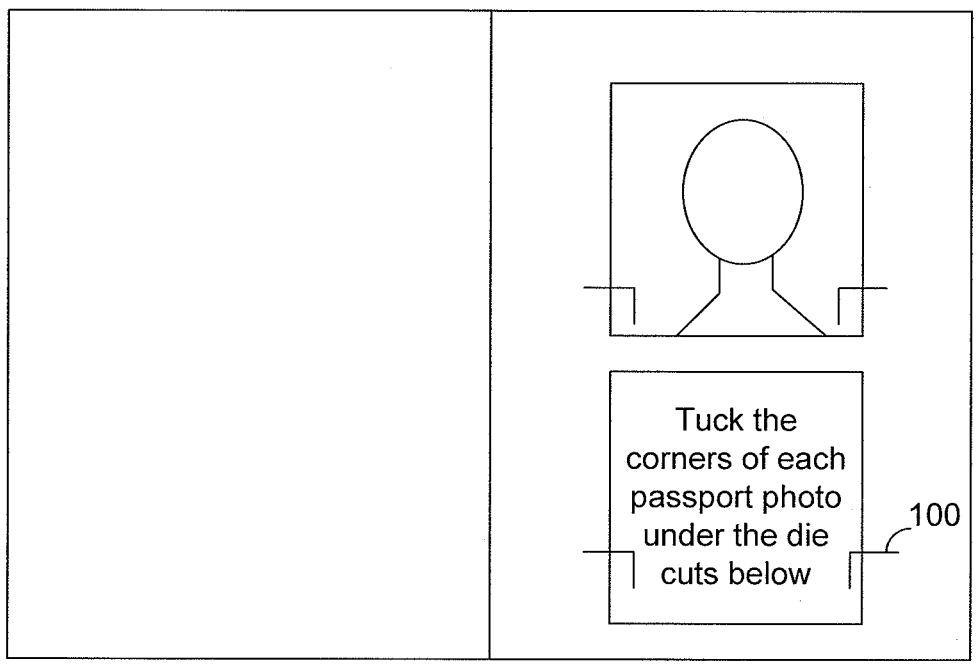
FIG. 1 is a prior art example of a passport folder.
Figure 2:
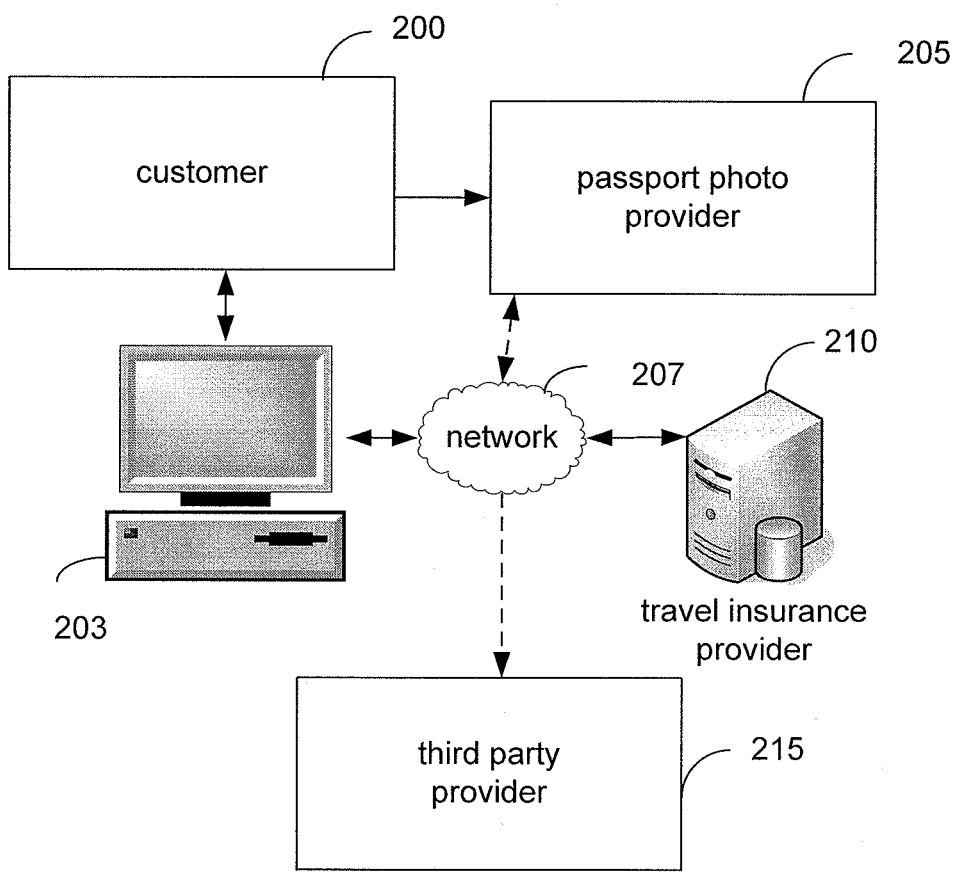
FIG. 2 is a block diagram of the relationship between different parties according to one embodiment of the invention.

FIG. 2 is a block diagram that illustrates the relationship between the different parties according to one embodiment of the invention. A customer 200 goes to a general purpose store that also functions as a passport photo provider 205, e.g. the US postal service, UPS, Fed Ex, Sprint, Walgreens, CVS, etc.

The passport photo provider 205 identifies the customer 200 based on the initial transaction of purchasing a passport photo as a subset of people that are likely to travel internationally in the near future. The passport photo provider 205 generates a passport photo and places it in a folder or a brochure that includes a token for identifying a travel insurance provider 210 and an incentive for purchasing travel insurance from the travel insurance provider 210. In one embodiment, the token includes a mechanism for purchasing travel insurance, such as a website or a phone number to call. The incentive is a discount for travel services. The customer 200 visits the website or calls the telephone number and purchases travel insurance from the travel insurance provider 210.

The token also includes a means for the travel insurance provider 210 to identify the source of the initial transaction. For example, the token is a URL with a tag on the end, such as www.travelinsurance.com/USPS1, which identifies the passport photo provider 205 as the United States Poster Service. The "1" can further identify a specific branch of the USPS. In another example, the token is a coupon code that the customer 200 enters during the purchase of travel insurance. In one embodiment, the passport photo provider 205 receives a commission each time a customer 200 purchases travel insurance. In another embodiment, a third-party provider 215, which functions as an intermediary by creating the brochures used by the passport photo provider 205, receives a commission from either the travel insurance provider 210 or the passport photo provider 205 each time a customer 200 purchases travel insurance.

When a customer 200 visits the website of the travel insurance provider 210 using a URL that includes a tag, the website is identical to the homepage, except that a discount is provided at the point of purchasing travel insurance. In another embodiment, the website is designed to target this identified group of people, for example, by only providing information on international travel, instead of both domestic and international travel. In an embodiment where there are many different passport photo providers 205, the tagged URL reroutes to a website for all customers 200 that are purchasing discounted travel insurance. This is more cost effective than maintaining a separate website for people that purchased their passport at a pharmacy, e.g. Walgreens versus a shipping store, e.g. USPS, etc.

In another embodiment of the invention, the token is a coupon code for obtaining a discount on travel insurance. The coupon code contains unique information for identifying the passport photo provider 205 as the source of the brochure. If the passport photo provider 205 has multiple offices, for example, the coupon code is one way of ensuring that the proper office branch receives the commission. In another embodiment, the token includes a telephone number for ordering travel insurance using the coupon code to obtain a discount, or some other mechanism for obtaining travel insurance that will be recognized by a person of ordinary skill in the art.

The discount is anything from greater than 0% to less than 100%. In one embodiment, the discount is 15%. The discount is applied by multiplying the cost of the medical insurance times the discount and subtracting the result from the cost. In another embodiment, the discount is for purchasing multiple types of insurance at the same time. For example, the discount may be a comprehensive plan for the price of one of the plans.

The customer 200 selects from different types of travel insurance or a comprehensive plan. For example, the medical assistance insurance plan provides 24-hour worldwide medical information and assistance, medical and dental referrals, dispatch of medication and medical supplies, and emergency medical evacuation. The evacuation service becomes increasingly useful as global warming increases the instances of natural disaster. Worldwide, for example, there are 1.5 evacuations every hour.

The personal assistance insurance plan includes legal referrals, emergency personal cash, emergency translation and interpreter services, and claims assistance. The travel assistance insurance provides emergency family travel arrangements, accommodations provided to traveling companion while visiting hospitalized member, and return of traveling companion. The travel insurance provider 210 may have its own clinics in one of the countries that a customer 200 visits. Furthermore, the travel insurance provider 210 can provide information over the Internet, such as travel health information, emergency records, and email health alerts. The travel insurance also includes a comprehensive membership program that gives the customer 200 access to all of the services.

The customer 200 conducts a second transaction by visiting the website using a client 203 and purchasing travel insurance from the travel insurance provider 210 over a network 207. The client 203 can be any type of computer that has a processor and memory, e.g. a personal computer, a mobile device, such as an iPhone, smart phone, etc. The processor executes a set of computer-executable program code instructions stored in the memory.

The purchase is transmitted over a network 207 to the travel insurance provider 210. This triggers a transaction between the travel insurance provider 210 and the passport photo provider 205. The travel insurance provider 210 rewards the passport photo provider 205 with a commission for identifying and directing the customer 200 to the travel insurance provider 210. In one embodiment, the commission is transmitted over the Internet. In another embodiment, the commission is transmission through another communication network such as an intranet.

The travel insurance provider 215 stores information about the customer 200 in association with the source for the sale, which is the passport photo provider 210. In one embodiment, the information is stored in a database contained on a computer or server. The information comprises a means for identifying the customer 200 such as a unique customer identification number, a date of the first purchase of travel insurance, the type of travel insurance and associated cost, any subsequent purchases of travel insurance, the passport photo provider 210 that initiated the first transaction, etc.

If the customer 200 purchases insurance for a subsequent trip, the passport photo provider 210 receives an additional commission. The passport photo provider 210 is identified in these subsequent transactions if the user continues to use the URL containing a tag or the coupon code. The customer 200 is motivated to keep using those methods because it provides the additional discount. If the customer 200 goes directly to the homepage of the travel insurance provider 215, however, the travel insurance provider 215 can access the database to match the customer with the passport photo provider 210.

In one embodiment, the brochure contains both a token and a URL for travel insurance and an advertisement for another travel service, e.g. lodging, travel, tourist programs, etc.

Figure 3:
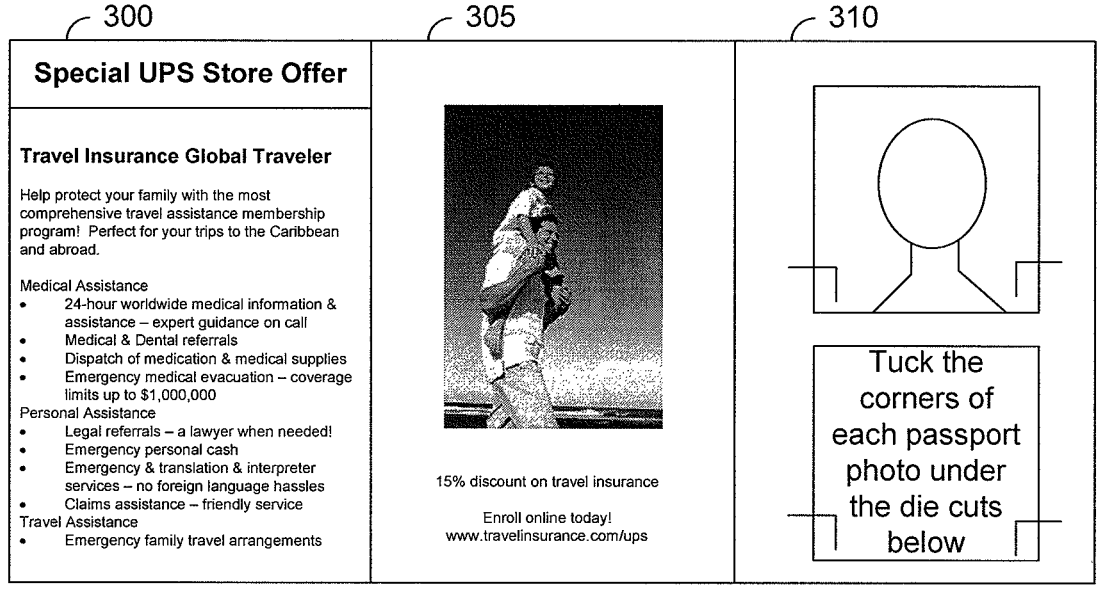
FIG. 3 is a passport folder that includes an incentive for travel insurance according to one embodiment of the invention.

FIG. 3 shows an example of a passport brochure according to one embodiment. The brochure has three partitions: one for explaining the type of travel insurance programs available 300; one for providing an incentive, such as a discount on travel insurance, and a token comprising a website for obtaining the travel insurance 305; and one for holding the passport photos 310. The partition for holding the passport photos 310 accommodates up to two photos, which are affixed to the brochure by inserting the corners of the photograph into the slits formed by the die cuts or cutting the paper in another way that allows the picture to be easily attached. In another embodiment, the pictures are affixed to the brochure by using an adhesive, such as two sided tape, rubber cement, or glue.

In another embodiment of the invention, a passport folder contains only the partition for providing an incentive to purchase travel insurance and a token for identifying the provider of travel insurance 305 and a partition for holding the passport photos 310.

In one embodiment, the brochure is made of paper. The paper can be thin or thick, as long as it flexible enough to form creases. In one embodiment, the brochure is laminated. The brochure is printed in color or in black and white.

Figure 4:
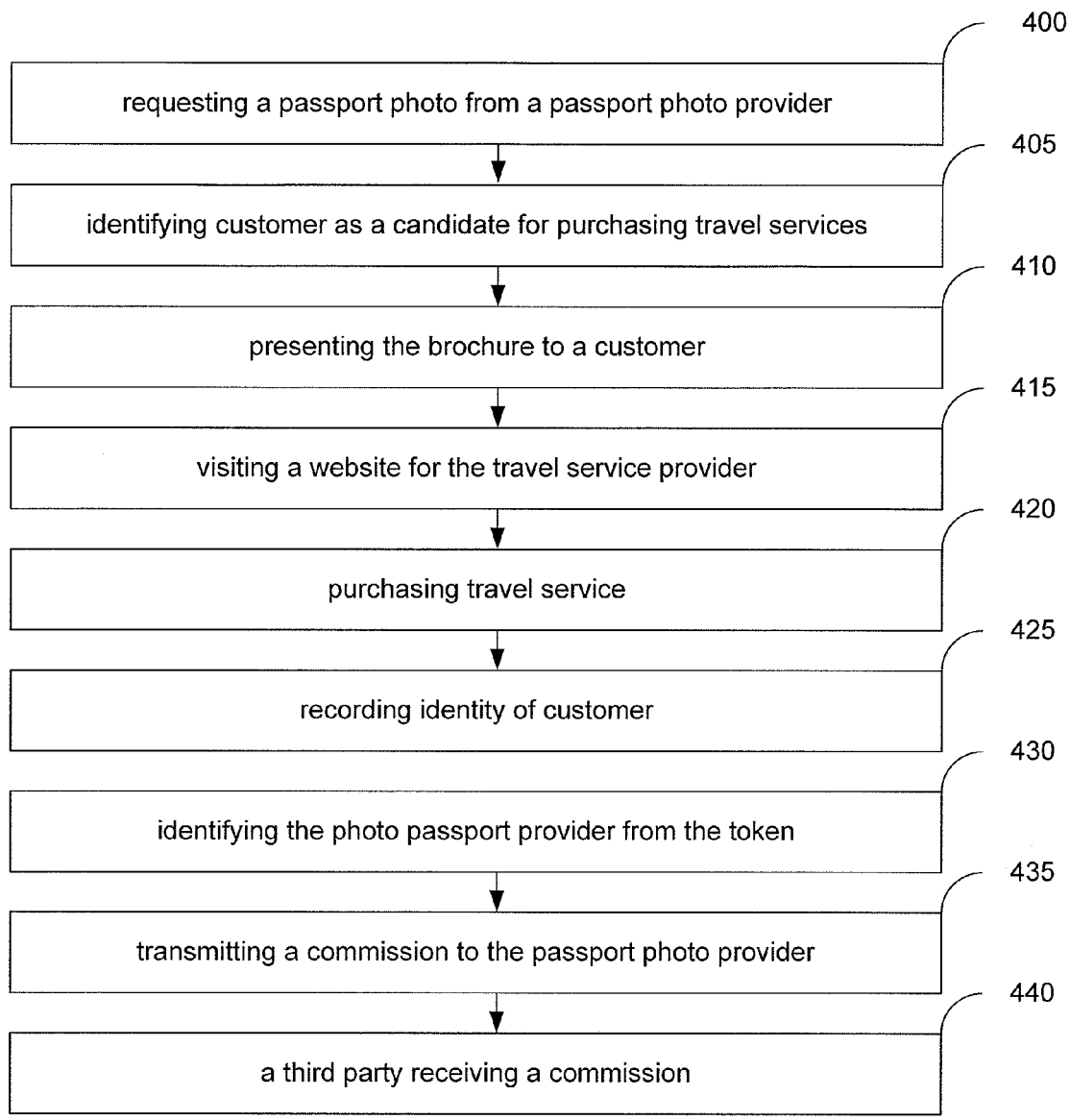
FIG. 4 is a flowchart that illustrates steps for obtaining a travel insurance customer according to one embodiment of the invention.

FIG. 4 is a flowchart that illustrates steps for generating a commission for a travel service provider through the use of an incentive and token. A customer 200 requests 400 a passport photo from a passport photo provider 205. This triggers the passport photo provider 205 to identify 405 the customer 200 as a candidate for purchasing travel services. The passport photo provider presents 410 the customer with a passport photo brochure, the brochure comprising all of an incentive to purchase a travel service, a token to identify the passport photo provider, and the passport photos according to one embodiment of the invention. In one embodiment, the brochure also contains descriptions of types of travel insurance that are available through the travel service provider.

The customer 200 visits 415 the website for the travel service provider and purchases 420 the travel service. The travel service provider records 425 the identity of the customer 200 in association with the specific passport photo provider 205 that sold the customer the passport photo. This second transaction is a triggering event for identifying 430 the passport photo provider 205 from the token. The travel service provider transmits 435 a commission to the passport photo provider 205. In one embodiment, a third party also receives 440 a commission for the purchase of the travel services either directly from the travel service provider or from the passport photo provider 205.

If the customer 200 makes a subsequent visit to the website, the steps either repeat starting with 430, or the travel service provider identifies the passport photo provider 205 by matching the customer 200 with information in a database containing customer information, such as the one depicted in FIG. 2. In one embodiment, the travel insurance provider 210 sends reminders to the customer 200 about purchasing travel services. This service can be automatic or optional.

Figure 5:
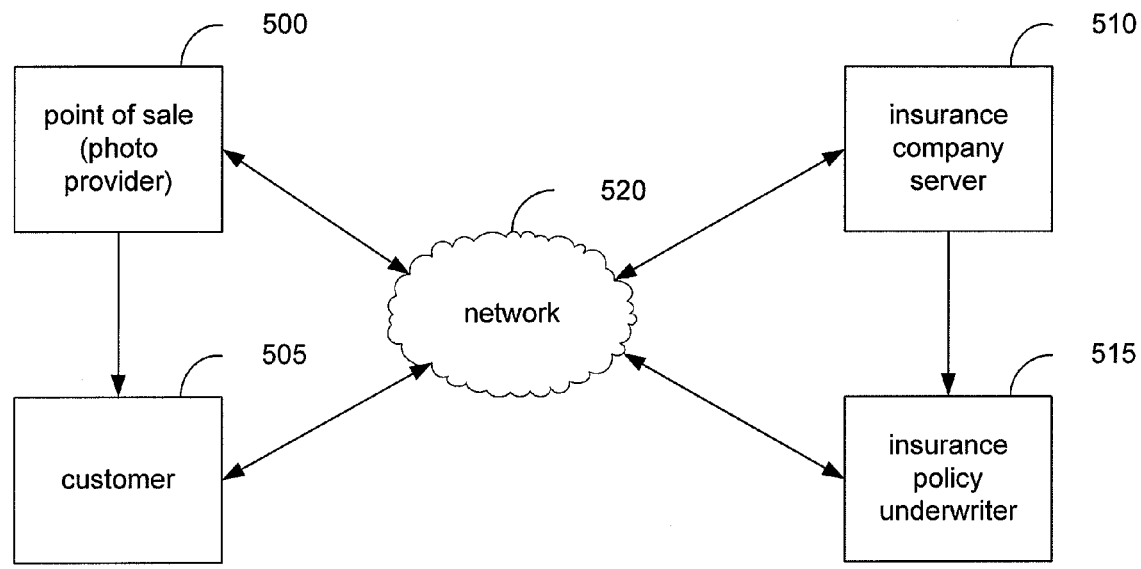
FIG. 5 is a block diagram of the relationship between a customer, the point of sale, an insurance company, and an underwriter for the insurance policy according to another embodiment of the invention.
Figure 6:
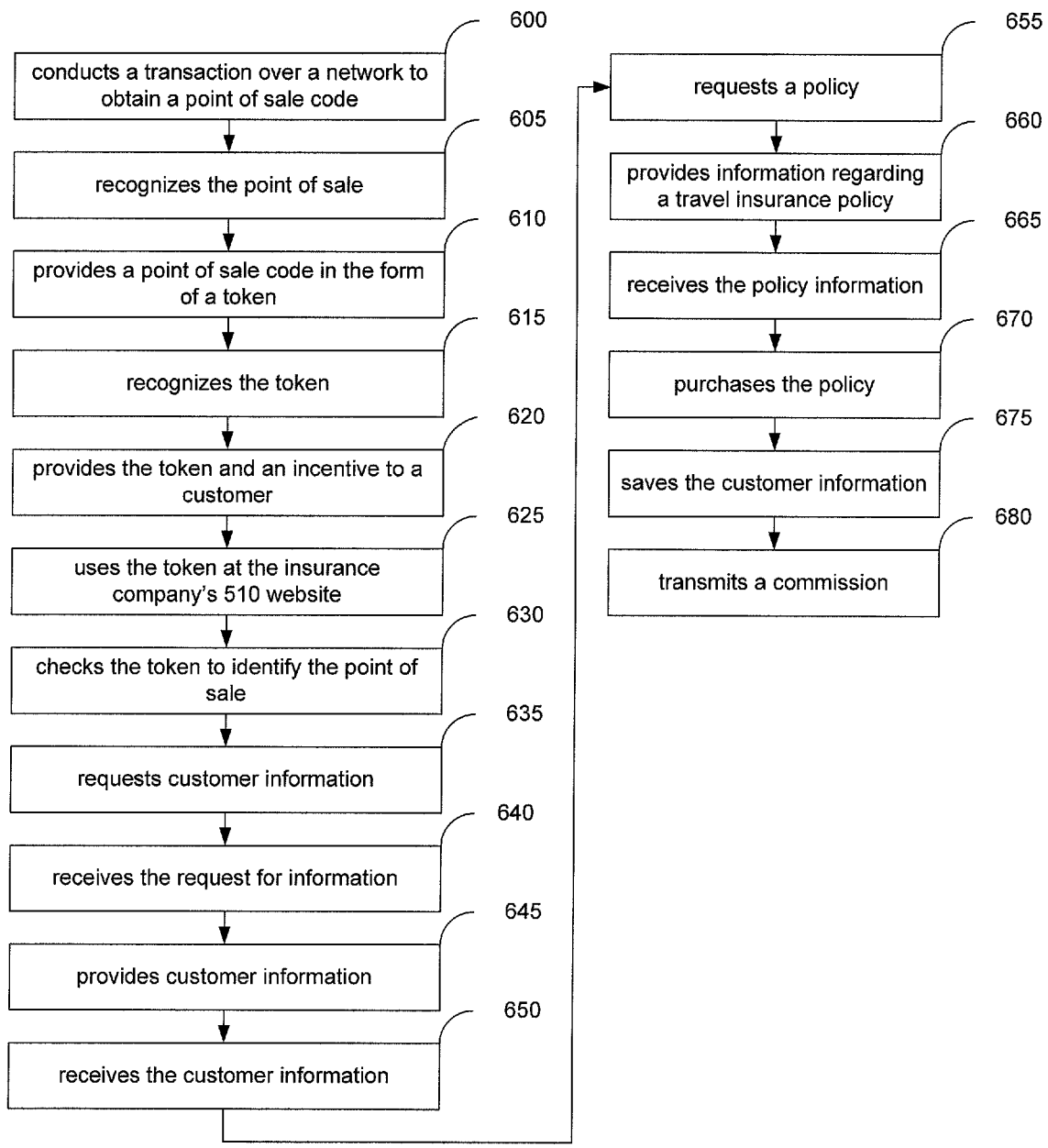
FIG. 6 is a flowchart that illustrates the steps for a point of sale to obtain a commission according to another embodiment of the invention.

FIG. 5 represents participants in another embodiment of the invention. FIG. 6 is a flow diagram that illustrates these steps according to one embodiment of the invention. The photo provider represents the initial point of sale 500. The point of sale 500 conducts 600 a transaction over a network, e.g. the Internet to contact an insurance company server 510 to obtain a point of sale code. The insurance company recognizes 605 the point of sale 500 and provides 610 a point of sale code in the form of a token. The point of sale 500 recognizes 615 the token and integrates the token and an incentive for purchasing travel insurance into a product package medium, e.g. a photo passport brochure. The point of sale 500 provides 620 the token to a customer 505. The customer 505 uses 625 the token at the insurance company's website. The insurance company server 510 checks 630 the token to identify the point of sale 500. The insurance company server 510 requests 635 customer information. The customer 500 receives 640 the request for information. The customer 500 provides 645 customer information. The insurance company server 510 receives 650 the customer information and requests 655 a policy from the policy insurance underwriter 515. The policy insurance underwriter 515 provides 660 information regarding the travel insurance policy that includes the discount provided at the point of sale 500. The customer 505 receives 665 the policy information. The customer 505 purchases 670 the policy from the insurance company 510. The insurance company server 510 saves 675 the customer information, for example, in a database and transmits 680 a commission to the point of sale 500.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A method for generating a commission for a passport photo provider, comprising:

receiving by a travel service processor a request from a customer to purchase a travel service, wherein said request includes both a token that identifies a travel service provider and an incentive applicable to the purchase of the travel service;

wherein said token comprises a uniform resource locator (URL) with a tag, said tag for identifying the passport photo provider;

wherein said token and said incentive were included as part of a product packaging provided to the customer pursuant to a purchase by the customer of a passport photo from a passport photo provider, said product packaging comprising all of a first discrete partition for displaying the incentive for purchasing the travel service from said travel service provider and the token for identifying the travel service provider, a discrete second partition for displaying how the customer may order the travel service from the travel service provider, and a third discrete partition to which the purchased passport photo of the customer is affixed;

wherein said passport photo provider identified the customer as part of an identified group of customers based on the purchase by the customer of the passport photo from the passport photo provider;

wherein when said customer visits a website of the travel service provider using said URL;

providing by the travel service processor said website modified to target the identified group of customers by only providing targeted information on travel;

identifying by the travel service processor the passport photo provider from the tag;

applying by the travel service processor the incentive to the purchase of the travel service;

processing by the travel service processor the purchase, including the applied incentive, of the travel service from the customer;

wherein said purchase of the travel service triggers a transaction between the travel service provider and the passport photo provider identified by the tag;

generating and transmitting by the travel service processor a commission to the passport photo provider identified by the tag in response to said purchase of the travel service triggering a transaction between said travel service provider and said passport photo provider identified by the tag; and maintaining by the travel service processor a record for the travel service provider for all customer information, an identity of the passport photo provider identified by the tag, and the travel service purchased by the customer with the applied incentive.

2. The method of claim 1, wherein the travel service is travel insurance.

3. The method of claim 2, wherein the travel insurance comprises any of medical assistance, personal assistance, travel assistance, a travel insurance clinic, online services, and a comprehensive membership plan.

4. The method of claim 1, wherein the third partition comprises a die cut at each corner of a rectangle, the passport photo being inserted into the die cuts.

5. The method of claim 1, wherein the product packaging further comprises an advertisement for a travel service.

6. The method of claim 1, wherein the incentive is a discount that is greater than 0% and less than 100%.

7. The method of claim 1, wherein the discount is 15%.

* * * * *